United States Patent Office 3,450,799
Patented June 17, 1969

3,450,799
CYCLIC POLYMERS OF HYDROXYMETHYL-PHENOXY PHOSPHONITRILES
Ehrenfried H. Kober, Hamden, Henry F. Lederle, North Haven, and Gerhard F. Ottmann, Hamden, Conn., assignors to Olin Mathieson Chemical Corporation, a corporation of Virginia
No Drawing. Filed Nov. 15, 1965, Ser. No. 507,660
Int. Cl. *C07d* 105/02; *C09j* 3/28; *C08g* 22/04
U.S. Cl. 260—927       2 Claims

ABSTRACT OF THE DISCLOSURE

Cyclic polymers of chloromethylphenoxy phosphonitriles can be hydrolyzed by heating at a temperature of 60 to 150° C. and in the presence of an alcoholic alkali metal hydroxide to yield cyclic polymers of hydroxymethylphenoxy phosphonitriles. These products can, in turn, be reacted with a diisocyanate in the presence of a suitable fluorocarbon blowing agent to yield fire-resistant polyurethane products.

---

This invention relates to novel cyclic polymeric chloromethylphenoxy phosphonitriles and cyclic polymeric hydroxymethylphenoxy phosphonitriles and to a method for their preparation.

The novel cyclic polymeric chloromethylphenoxy phosphonitriles of this invention have the formula:

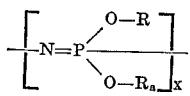

wherein $x$ is an integer of from 3 to 7 and wherein the R and $R_a$ substituents of each polymeric unit of the formula:

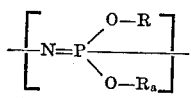

are independently selected from the group consisting of phenyl or

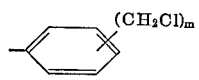

wherein $m$ is an integer of from 1 to 3 inclusive and with the proviso that at least one of the R and $R_a$ substituents is

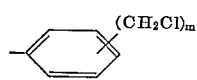

The formula of the polymeric hydroxymethylphenoxy phosphonitriles of this invention is shown below:

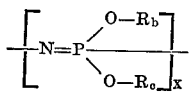

wherein $x$ is an integer of from 3 to 7 and wherein the $R_b$ and the $R_c$ substituents of each polymeric unit of the formula:

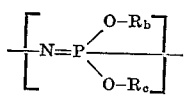

are independently selected from the group consisting of phenyl or

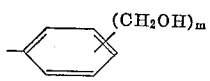

wherein $m$ is an integer of from 1 to 3 inclusive and with the proviso that at least one of the $R_b$ and $R_c$ substituents is

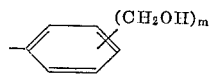

Preparation of the polymeric chloromethylphenoxy phosphonitriles of this invention is accomplished in good yield by reacting a chloromethyl alkyl ether of the formula:

$$ClCH_2\text{—}O\text{—}R_d$$

wherein $R_d$ is alkyl of from 1 to 6 carbon atoms, with a cyclic polymeric phenoxy phosphonitrile of the formula:

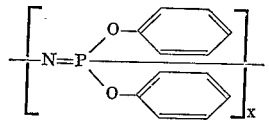

wherein $x$ is an integer of from 3 to 7. The reaction is conducted in the presence of an inert solvent which can be, for example, carbon disulfide or carbon tetrachloride and in the presence of stannic chloride which serves as catalyst. The chloromethylated product can be recovered from the two phase reaction mixture by any convenient method, such as by extraction with a lower dialkyl ether (for example, diethyl ether) followed by evaporation of the solvent. If chloromethylation of each of the phenoxy groups of the starting phosphonitrile is desired, not less than the stoichiometric requirement of the chloromethyl alkyl ether is employed. If partial chloromethylation is the objective, the quantity of the ether is reduced to the appropriate molar stoichiometric necessity.

Cyclic polymeric phenoxy phosphonitriles of the formula

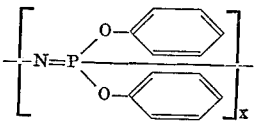

where $x$ is an integer of from 3 to 7 can be prepared by heating a phosphonitrile chloride and phenol in the presence, of sodium hydroxide as described by Fitzsimmons and Shaw, J. Chem. Soc., 1964, p. 1735.

The cyclic polymeric chloromethylphenoxy phosphonitriles of this invention, that is cyclic polymeric compounds of the formula:

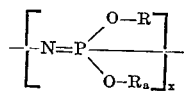

wherein $x$ is an integer of from 3 to 7 and wherein the R and $R_a$ substituents of each polymeric unit of the formula:

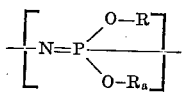

are independently selected from the group consisting of phenyl or

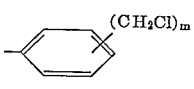

wherein $m$ is an integer of from 1 to 3 inclusive and with the proviso that at least one of the R and $R_a$ substituents is

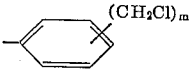

can be hydrolyzed by heating at a temperature of from about 60 to about 150° C. and in the presence of alcoholic alkali metal hydroxide such as sodium or potassium hydroxide to yield hydroxy derivatives of the formula:

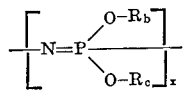

wherein $x$ is an integer of from 3 to 7 and wherein the $R_b$ and $R_c$ substituents of each polymeric unit of the formula:

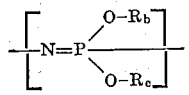

are independently selected from the group consisting of phenyl and

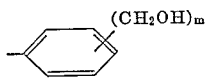

wherein $m$ is an integer of from 1 to 3 inclusive and with the proviso that at least one of the $R_b$ and $R_c$ substituents is

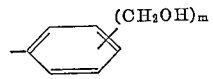

The novel cyclic polymeric hydroxymethylphenoxy phosphonitriles can be reacted with a diisocyanate in the presence of a suitable fluorocarbon blowing agent to yield fire-resistant polyurethane products or the polymeric hydroxymethylphenoxy phosphonitriles can be reacted with an alkylene oxide, such as ethylene oxide, propylene oxide or a hydroxyalkylene oxide, such as glycidol, to yield water-soluble oxyalkylated products suitable for use in hydraulic fluids or in the preparation of polyurethane foams and coatings.

Examples which illustrate various embodiments of this invention and which are to be considered not limitative follow:

EXAMPLE I

A 250 ml. three neck flask was charged with chloromethyl methyl ether (25 g., 0.313 moles), trimeric bis(phenoxy)phosphonitrile (21.2 g., 0.0306 moles) and 120 ml. of carbon disulfide. The mixture was stirred and cooled to 0° C. Stannic chloride (15 g., 0.0576 moles), was then added through a dropping funnel during a period of fifty minutes. A slight exotherm was noted. After the addition had been finished, the resulting two-layer reaction mixture was stirred for another hour and then permitted to warm to room temperature.

After standing for two days, the mixture was poured over ice and the organic layer was taken up in ether, washed, and dried over magnesium sulfate. After filtration and after stripping first to 60° C. bottoms temperature at atmospheric pressure and then to 100° C. at water aspirator pressure, a yield of 23.1 g. of the chloromethylated product was obtained. A chlorine analysis indicated that this material contained 6.87 percent chlorine corresponding approximately to an average of 1.75 chloromethyl groups per mole of the phosphonitrile.

EXAMPLE II

A 500 ml. three neck flask, fitted with a thermometer, condenser, magnetic stirrer and dropping funnel, was charged with chloromethyl methyl ether (50.0 g., 0.626 mole), trimeric bis(phenoxy)phosphonitrile (42.6 g., 0.184 mole) and 240 ml. of carbon disulfide. Stirring was started and then 30.0 g. of stannic chloride (13.5 ml.) was added via the dropping funnel during a period of about two hours, the temperature being maintained at 26–31° C. Stirring at room temperature was continued for another four hours.

After standing for three days, the product, composed of two layers, was poured over ice water and extracted with ether. The ether extracts were then dried over magnesium sulfate containing a small amount of potassium carbonate. After filtration of the drying agent, the solvent was stripped first to 60° C. bottoms temperature at atmospheric pressure, and then to 65° C. at water aspirator pressure to give 49.4 g. of product. The product contained 9.77 percent chlorine corresponding approximately to an average of 2.2 chloromethyl groups per molecule of the phosphonitrile.

EXAMPLE III

Trimeric bis(phenoxy)phosphonitrile was reacted with chloromethyl methyl ether under the same conditions as set forth in Example II except that stirring at room temperature was carried out for 90 hours after addition of $SnCl_4$ was completed. After isolation of the reaction product as described in Example II, the resulting chloromethylated product was found by analysis to contain approximately 12.5 chloromethyl groups per molecule of the phosphonitriles.

EXAMPLE IV

Chloromethylated trimeric bis(phenoxy)phosphonitrile (8.2 g.) prepared in Example I, containing 6.87 percent chlorine, was dissolved in 80 ml. of ethanol containing 10 g. of dissolved potassium hydroxide. The mixture was stirred and refluxed for 6.5 hours.

The cooled product was poured into an excess of water, extracted with ether, the ether extracts washed with water and dried over magnesium sulfate. After filtration of the drying agent, the solvent was stripped first to 55° C. bottoms at atmospheric pressure, then to 70° C. at water aspirator pressure. A yield of 5 g. of the hydroxymethylphenoxy phosphonitrile product was obtained. The chlorine content of this product was less than 0.06 percent, indicating that the hydrolysis of the chlorine to hydroxyl groups was essentially quantitative.

We claim:

1. A cyclic polymeric phosphonitrile compound of the formula:

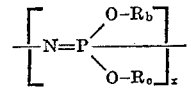

wherein $x$ is an integer of from 3 to 7 and wherein the $R_b$ and $R_c$ substituents of each polymeric unit of the formula:

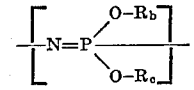

are independently selected from the group consisting of phenyl and

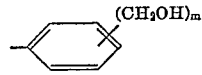

wherein $m$ is an integer of from 1 to 3 inclusive and with the proviso that at least one of the $R_b$ and $R_c$ substituents is

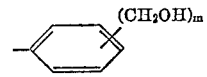

2. The compound of claim 1 wherein $x$ is 3.

References Cited

Wagner and Zook, Synthetic Organic Chemistry, John Wiley and Sons, Inc. 1953, pp. 170 and 171.

CHARLES B. PARKER, *Primary Examiner.*

ANTON H. SUTTO, *Assistant Examiner.*

U.S. Cl. X.R.

252—78; 260—2, 77.5, 973, 968